(12) United States Patent
Cantoni et al.

(10) Patent No.: US 10,023,160 B2
(45) Date of Patent: Jul. 17, 2018

(54) AUTOMATICALLY CONTROLLED ACTUATOR DEVICE FOR BRAKES

(71) Applicant: FRENI BREMBO S.p.A., Curno, Bergamo (IT)

(72) Inventors: Carlo Cantoni, Bergamo (IT); Roberto Arienti, Bergamo (IT); Massimo Gualandris, Bergamo (IT); Alberto Comenduli, Bergamo (IT)

(73) Assignee: Freni Brembo S.p.A., Curno, Bergamo (IT)

( * ) Notice: Subject to any disclaimer, the term of this patent is extended or adjusted under 35 U.S.C. 154(b) by 0 days.

(21) Appl. No.: 14/999,691

(22) PCT Filed: Dec. 17, 2014

(86) PCT No.: PCT/IB2014/067001
§ 371 (c)(1),
(2) Date: Jun. 16, 2016

(87) PCT Pub. No.: WO2015/092699
PCT Pub. Date: Jun. 25, 2015

(65) Prior Publication Data
US 2016/0362092 A1    Dec. 15, 2016

(30) Foreign Application Priority Data
Dec. 19, 2013   (IT) .............................. TO2013A1050

(51) Int. Cl.
*B60T 7/10*   (2006.01)
*B60T 7/08*   (2006.01)
(Continued)

(52) U.S. Cl.
CPC .............. *B60T 7/085* (2013.01); *B60T 7/102* (2013.01); *B60T 8/32* (2013.01); *B60T 8/4004* (2013.01);
(Continued)

(58) Field of Classification Search
CPC . B60T 7/085; B60T 7/102; B60T 8/32; B60T 8/4004; B60T 8/4233; B60T 11/16; B60T 13/686; B60T 13/745
See application file for complete search history.

(56) References Cited

U.S. PATENT DOCUMENTS 6,047,546 A * 4/2000 Takeyama ............. B60T 13/745
                                                    60/533
7,922,264 B2   4/2011 Baumann et al.
(Continued)

FOREIGN PATENT DOCUMENTS

DE    8608011 U1   4/1987
EP    2100784 A2   9/2009

OTHER PUBLICATIONS

European Patent Office, Italian Search Report IT 102013902219202 (IT-TO2013A1050); dated Sep. 11, 2014, 2 pages, European Patent Office, Munich, Germany.
(Continued)

*Primary Examiner* — Thomas W Irvin
(74) *Attorney, Agent, or Firm* — Marshall & Melhorn, LLC

(57) ABSTRACT

Actuator device for brakes suitable to be operatively connected to at least a first braking device acting on a brake disc or drum, so as to exercise a braking action,
the actuator device for brakes being fitted with a lever and/or pedal for its manual operation, and being provided with a body which houses at least one piston which acts on a hydraulic circuit fluidically connected to said at least one first braking device for the hydraulic operation thereof,
the lever and/or pedal being operatively connected to said piston so as to command its movement in an operating direction so as to exert pressure on the fluid of the hydraulic circuit,
characterized in that
the actuator device for brakes is fitted with an automatic actuator, operatively connected to the piston and/or to the
(Continued)

operating lever and/or pedal so as to increase, control or reduce the braking action imposed manually by the operation of the operating lever and/or pedal, controlling the operating stroke of the piston.

18 Claims, 4 Drawing Sheets

(51) Int. Cl.
  *B60T 8/32* (2006.01)
  *B60T 8/40* (2006.01)
  *B60T 13/74* (2006.01)
  *B60T 11/16* (2006.01)
  *B60T 13/68* (2006.01)
  *B60T 8/42* (2006.01)

(52) U.S. Cl.
  CPC ............ *B60T 11/16* (2013.01); *B60T 13/686* (2013.01); *B60T 13/745* (2013.01); *B60T 8/4233* (2013.01)

(56) References Cited

U.S. PATENT DOCUMENTS

| | | | | |
|---|---|---|---|---|
| 8,459,753 | B2* | 6/2013 | Vollert | B60T 13/745 303/114.1 |
| 8,899,696 | B2 | 12/2014 | Weiberle et al. | |
| 8,991,940 | B2* | 3/2015 | Ueno | B60T 13/745 303/115.2 |
| 9,108,609 | B2* | 8/2015 | Usui | B60T 13/745 |
| 9,663,088 | B2* | 5/2017 | Takayama | B60T 13/745 |
| 9,707,949 | B2* | 7/2017 | Charpentier | B60T 13/745 |
| 9,731,694 | B2* | 8/2017 | Schwarz | B60T 13/746 |
| 2009/0045672 | A1* | 2/2009 | Nishino | B60T 7/042 303/113.3 |
| 2009/0261649 | A1* | 10/2009 | Higuma | B60T 8/4275 303/113.3 |
| 2010/0275593 | A1* | 11/2010 | Okada | B60T 13/162 60/545 |
| 2013/0082514 | A1* | 4/2013 | Murakami | B60T 13/686 303/14 |
| 2016/0200309 | A1* | 7/2016 | Svensson | B60T 13/686 303/15 |
| 2017/0001615 | A1* | 1/2017 | Adler | B60T 7/042 |
| 2017/0036659 | A1* | 2/2017 | Murakami | B60T 7/042 |
| 2017/0297546 | A1* | 10/2017 | Takeda | B60T 13/662 |

OTHER PUBLICATIONS

European Patent Office, International Search Report and Written Opinion of PCT/IB2014/067001; dated Sep. 15, 2015, 7 pages, European Patent Office, Rijswijk, Netherlands.

* cited by examiner

AUTOMATICALLY CONTROLLED ACTUATOR DEVICE FOR BRAKES

FIELD OF APPLICATION

The present invention relates to an automatically controlled actuator device for brakes, in particular for vehicles.

STATE OF THE ART

In particular, in the field of brake systems for vehicles, it is known of to provide control devices of the braking force imposed by the user acting on the relative manual controls such as levers and/or pedals.

Such control devices have for example a function of preventing that as a result of an excessive braking action requested by the user, the vehicle may incur in the blocking of one or more wheels which would compromise the stability and control of the same.

In addition, said control devices can be efficiently used for a dynamic control of the vehicle stability: it is indeed known that by applying an appropriate braking force to individual wheels, or for example by changing the distribution of the braking force on different axles of the vehicle (whether with two, three, four or more wheels), it is possible to generate yaw moments able to correct the trajectory of the vehicle, improving the dynamic control thereof.

PRESENTATION OF THE INVENTION

The solutions of the prior art typically provide antiblocking systems, known by the name of ABS systems, which act substantially on the pressure of the hydraulic circuit, of the braking system so as to reduce the hydraulic pressure and thus the braking force on each wheel subject to momentary blocking. The same function is used to variably divide the braking force between different axles of the vehicle.

It is also known of to use systems in which the user creates a pressure acting on the manual control and a control system interprets such pressure request transforming it into the corresponding pressure and braking action in the connected braking system. This way, the user never has direct control of the braking system, but there is always a controller with corresponding actuators which translates the manual action of the user into a corresponding hydraulic pressure and braking action in the connected braking system.

Such known systems, while on the one hand making it possible to avoid the blocking of the wheels and/or to perform a stability control of the vehicle, on the other never give the user a clear and precise sensation of control of the vehicle.

In other words, the user does not perceive the intervention of the braking correction made by the system, but merely provides a braking request which is in turn processed by the control unit.

As a result, the known systems are certainly effective but do not actually give the user the sensation of full control of the vehicle. This feeling of full control can be extremely useful in extreme situations, such as when a motor vehicle enters a bend with the brakes clamped in such conditions not having a full perception of the actual braking torque transmitted to the front of the vehicle may result in a sudden loss of control of the vehicle and in falls.

The need is therefore felt to resolve the drawbacks and limitations mentioned with reference to the prior art.

In particular the need is felt to make available an actuator device for brakes which permits effective control of the braking of the wheels in all conditions of use, avoiding dangerous blocking, and which makes it possible to act effectively on the control of the stability of the vehicle, always giving the user a precise feedback on the actual control of the braking/stability, to significantly improve the sensation of control, i.e. the user's confidence in the vehicle.

Such need is satisfied by an actuator device for brakes according to claim 1.

In particular, such need is satisfied by an actuator device for brakes suitable to be operatively connected to at least a first braking device acting on a brake disc or drum, so as to exercise a braking action, the actuator device for brakes being fitted with a lever and/or pedal for its manual operation, and being provided a body which houses at least one piston which acts on a hydraulic circuit fluidically connected to said at least one first braking device for the hydraulic operation thereof, the lever and/or pedal being operatively connected to said piston so as to command its movement or operating stroke in an operating direction X so as to exert pressure on the fluid of the hydraulic circuit, characterised in that the actuator device for brakes is fitted with an automatic actuator, operatively connected to the piston and/or to the operating lever and/or pedal, so as to increase, control or reduce the braking action imposed manually by operating the operating lever and/or pedal, controlling the operating stroke of the piston.

According to a possible embodiment, the body identifies a first chamber which houses said piston fitted with at least a first head, the first chamber being provided with a delivery opening fluidically connected to the at least one first braking device so as to receive the fluid pressurised by the first head during the stroke of the piston, wherein the body identifies a second chamber which houses a second head of the piston, the second chamber being in connection with the automatic actuator so as to exercise on the piston a thrust action in accordance or discordance with the thrust action exercised by the operating lever and/or pedal.

According to a possible embodiment, the second W chamber houses a pusher element connected to the automatic actuator and moved by relative drive means, said pusher element interfacing with the second head of the piston.

According to a possible embodiment, the first and the second chamber are fluidically separate from each other.

According to a possible embodiment, the second chamber is filled with a liquid pressed by the automatic actuator, so as to be able to exercise a thrust action on the second head following the operation of the automatic actuator device.

According to a possible embodiment, said first and second chambers are positioned in series with each other and are at least partially separated by a separation septum fixed in relation to the body, the piston comprising a stem slidingly joined in an airtight manner to a hole made on said separation septum, the stem connecting the first and second head of the piston to each other.

According to a possible embodiment, the second chamber houses elastic return means which exercise a thrust action on the piston pressing it towards a rest condition, in a rest direction, opposite said operating direction.

According to a possible embodiment, the body houses a first chamber, which defines a delivery stage, a second chamber, which defines a contrast or control stage, wherein said chambers are coaxial and at least partially penetrate each other, despite being fluidically separate from each other.

According to a possible embodiment, the body also delimits a compensation stage defined by a compensation chamber which acts as compensation for variations in the level of liquid of the hydraulic circuit connected to the actuator device for brakes.

According to a possible embodiment, the automatic actuator comprises motor means and a pump, operatively connected to said motor means, able to pressurise fluid to send to the body of the manual actuator device.

According to a possible embodiment, the motor means are mechanically connected to the pump or to a part thereof by means of a kinematism.

According to a possible embodiment, the at least one kinematism comprises ball bearing screws.

According to a possible embodiment, the automatic actuator comprises contrast means operatively connected to the lever or pedal, so as to be able to exercise a thrust action in accordance or discordance with the operating thrust on the lever or pedal.

According to a possible embodiment, the contrast means are directly connected to a portion of the operating lever or pedal.

According to a possible embodiment, the contrast means are connected to a transmission which operatively connects the operating lever or pedal to the piston.

According to a possible embodiment, the contrast means are operated by an electric, hydraulic or pneumatic motor.

According to a possible embodiment, said electric, hydraulic or pneumatic motor is operatively connected to the contrast means by means of at least one kinematism comprising ball bearing screws.

According to a possible embodiment, the automatic actuator is at least partially housed in the body of the manual actuator device.

According to a possible embodiment, the automatic actuator device is mechanically associated to the body of the manual actuator device.

According to a possible embodiment, the actuator device for brakes comprises at least one command panel operatively connected to the automatic actuator, so as to command the operation thereof depending on the measurement parameters of the dynamic functioning of the associable vehicle.

DESCRIPTION OF THE DRAWINGS

Further characteristics and advantages of the present invention will be more clearly comprehensible from the description given below of its preferred and non-limiting embodiments, wherein.

The elements or parts of elements common to the embodiments described below will be indicated using the same reference numerals.

DETAILED DESCRIPTION

Figure 1:
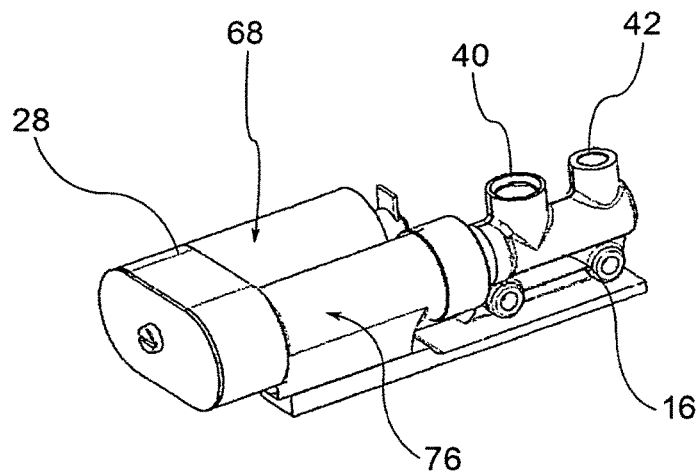
FIG. 1 shows a perspective view of an actuator device for brakes according to one embodiment of the present invention.
Figure 2:
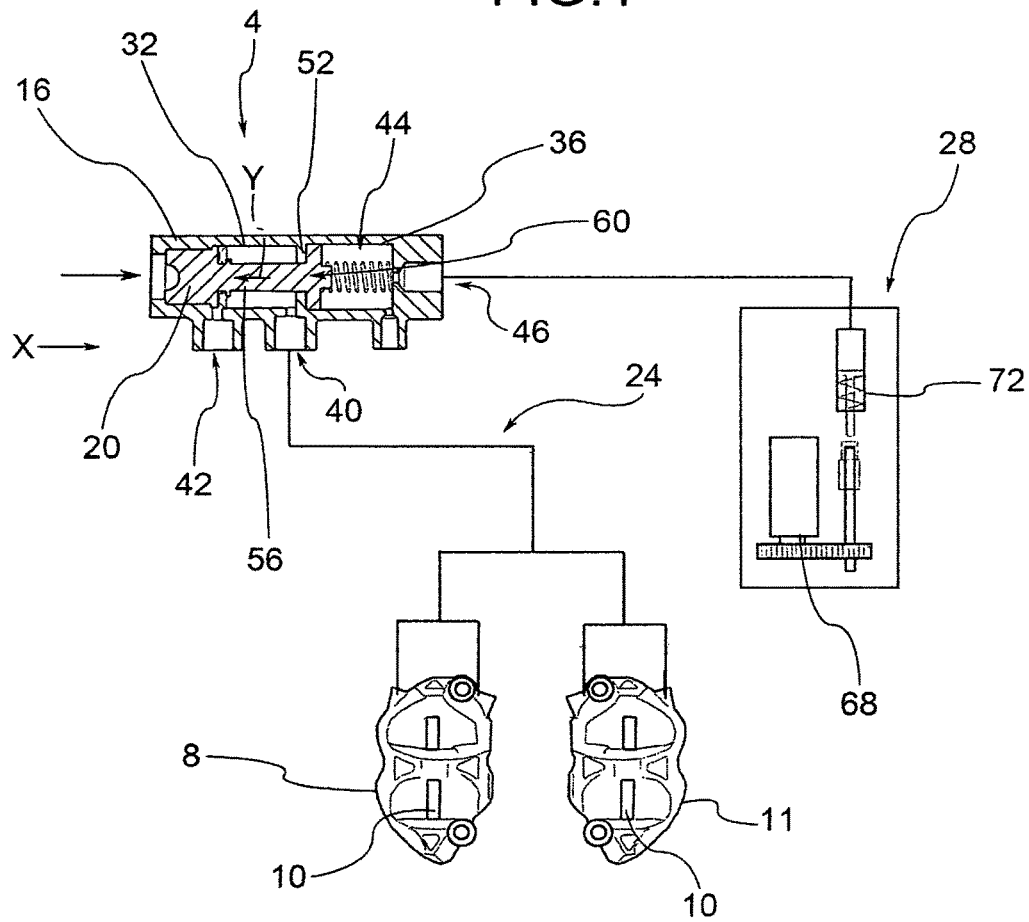
FIG. 2 shows a cross-section view of the device in FIG. 1, applied to a braking system.
Figure 3:
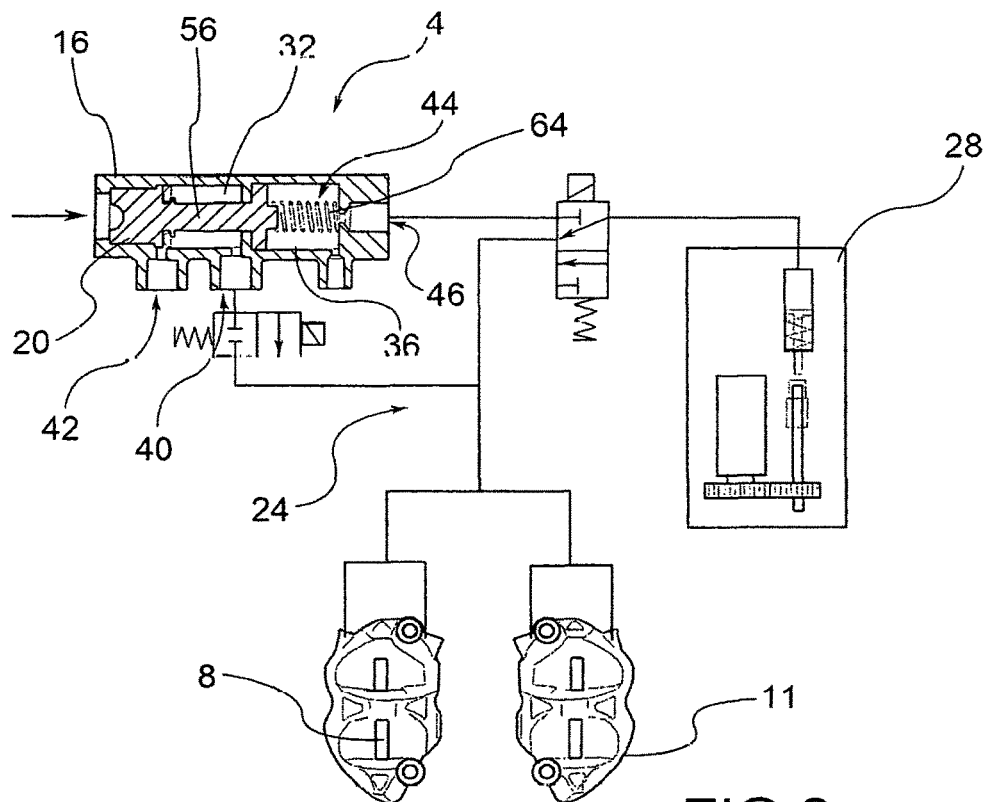
FIG. 3-4 show perspective views of further braking systems comprising the actuator device for brakes according to the present invention.
Figure 4:
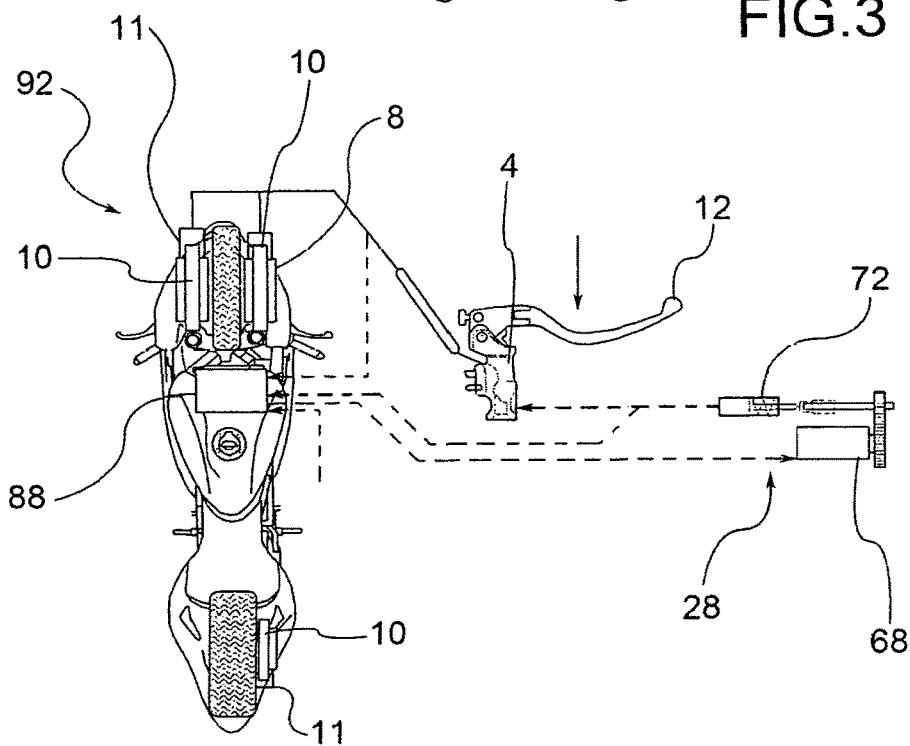
Figure 5:
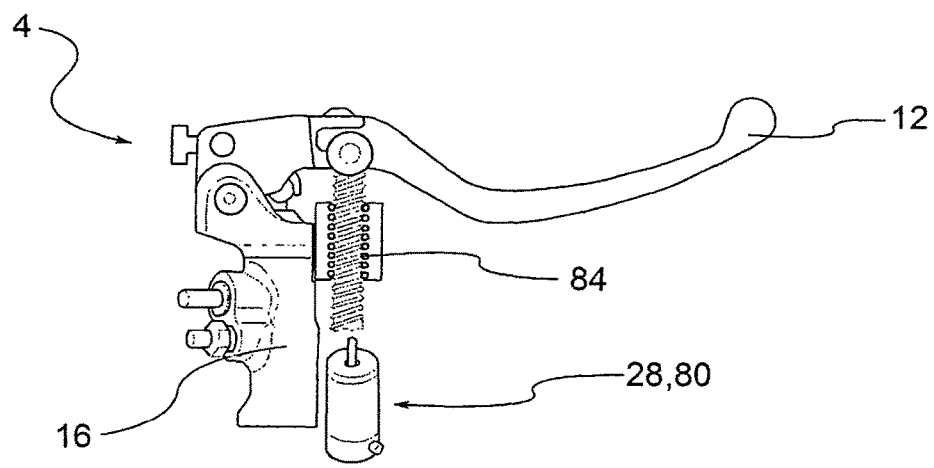
FIGS. 5-7 shows a perspective view of actuator devices for brakes according to variants of the present invention.
Figure 6:
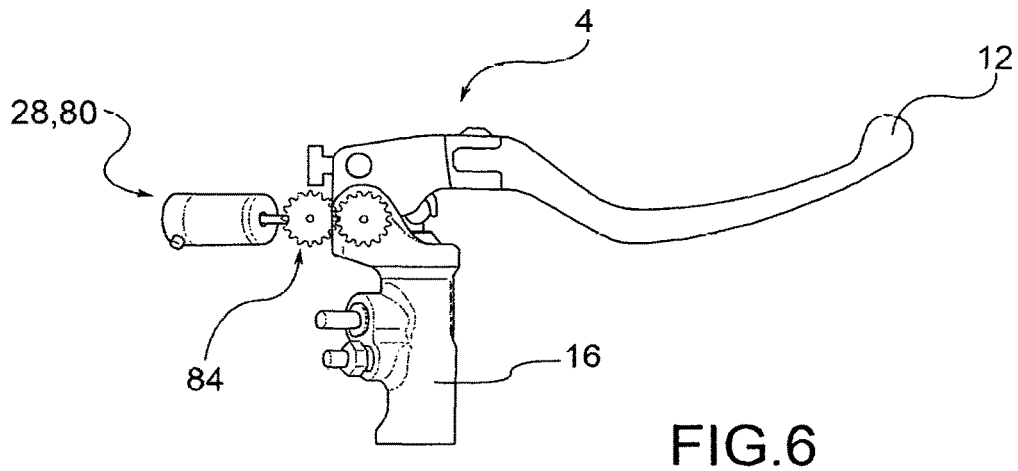
Figure 7:
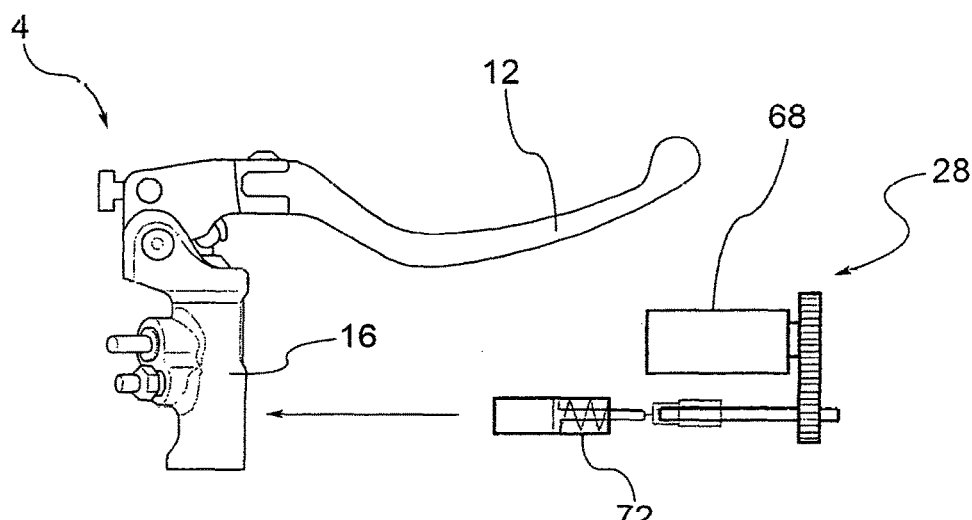

With reference to the aforementioned figures, reference numeral 4 globally denotes an actuator device for brakes suitable to be operatively connected to at least a first braking device 8 acting on a brake disc or drum 10, so as to exercise a braking action.

For example, the first braking device 8 may comprise a caliper for a disc brake arranged astride a brake disc or may comprise one or more shoes which intercept a drum of a drum brake.

The braking device 8 may be operatively connected to further braking devices 11, comprising both calipers for disc brakes and drums, acting on the same or on separate wheels of a vehicle; said wheels may be on the same axle or on different axles of the vehicle.

The actuator device for brakes 4 is fitted with a lever and/or pedal 12 for its manual operation, and is provided with a body 16 which houses at least one piston 20 which acts on a hydraulic circuit 24 fluidically connected to said at least one first braking device 8 for the hydraulic operation thereof.

The lever and/or pedal 12 are operatively connected to said piston 20 so as to command its movement or operating stroke in an operating direction X, to exert pressure on the fluid of the hydraulic circuit.

Advantageously, the actuator device for brakes 4 is fitted with an automatic actuator 28, operatively connected to the piston 20 and/or to the operating lever and/or pedal 12, so as to increase, control or reduce the braking action imposed manually by operating the operating lever and/or pedal 12, controlling the operating stroke of the piston 20.

According to one embodiment, the automatic actuator 28 is at least partially housed in the body 16 of the actuator device for brakes 4.

According to a possible embodiment, the automatic actuator 28 is mechanically associated to the body 16 of the actuator device for brakes 4.

According to one embodiment, the body 16 identifies a first chamber 32 which houses said piston 20 fitted with at least a first head 36, the first chamber 32 being provided with a delivery opening 40 fluidically connected to the at least one first braking device 8 so as to receive the fluid pressurised by the first head 36 during the stroke of the piston.

According to one embodiment, the body also defines an input opening 42 which serves to allow the flow of hydraulic fluid coming typically from a tank not shown (in the known manner). This input opening 42 flows into the first chamber 32 which houses the first head 36 of the piston 20.

According to one embodiment, in the rest condition, the first head of the piston does not occlude said input opening 42; therefore, the liquid coming from the tank is able to flow into the first chamber 32 so as to compensate for the wear of the pads of the braking devices.

During the operating stroke of the piston 20, the first head 36 occludes the input opening 42 and pressurises the liquid contained in the first chamber 32.

The first chamber 32 defines a delivery stage of the actuator device for brakes 4.

The body 16 defines a second chamber 44 which houses a second head 48 of the piston 20, the second chamber 44 being in connection with the automatic actuator 28 so as to exert a thrust action on the piston 20 concordant or discordant with the thrust action exerted by the lever or operating pedal 12.

The second chamber 44 identifies a control or contrast stage of the actuator device for brakes 4.

The second chamber 44 is provided with a feed opening 46 of the contrast stage.

According to one embodiment, the second chamber 44 houses a pusher element connected to the automatic actuator 28 and moved by relative drive means, said pusher element interfacing with the second head of the piston.

Preferably, the first and the second chambers 32, 44 are fluidically separate from each other.

According to one embodiment, the second chamber 44 is filled with a liquid pressed by the automatic actuator 28, so as to be able to exercise a thrust action on the second head 48 following the operation of the automatic actuator device 28.

According to one embodiment, the first and second chambers 32, 44 are positioned in series with each other and at least partially separated by a separation septum fixed in relation to the body 16, the piston 20 comprising a stem 56 slidingly joined in an airtight manner to a hole 60 made on said separation septum 52, the stem 56 connecting the first and second heads 36, 48 of the piston 20 to each other.

According to one embodiment, the second chamber 44 houses elastic return means 64 which exercise a thrust action on the piston 20 pressing it towards a rest condition, in a rest direction Y, opposite said operating direction X.

Figure 8:
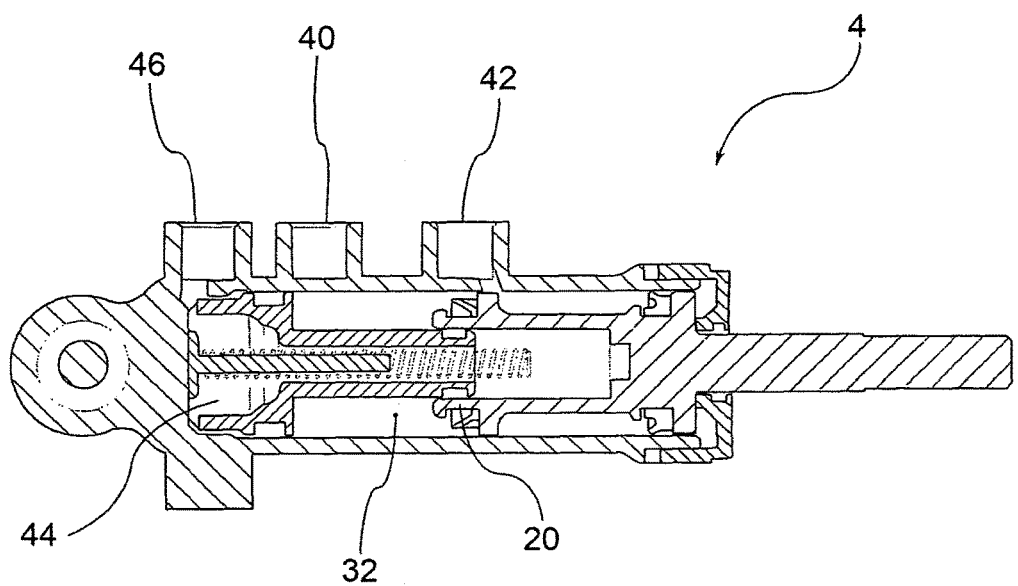
FIGS. 8-9 show perspective views of actuator devices for brakes according to further variants of the present invention.
Figure 9:
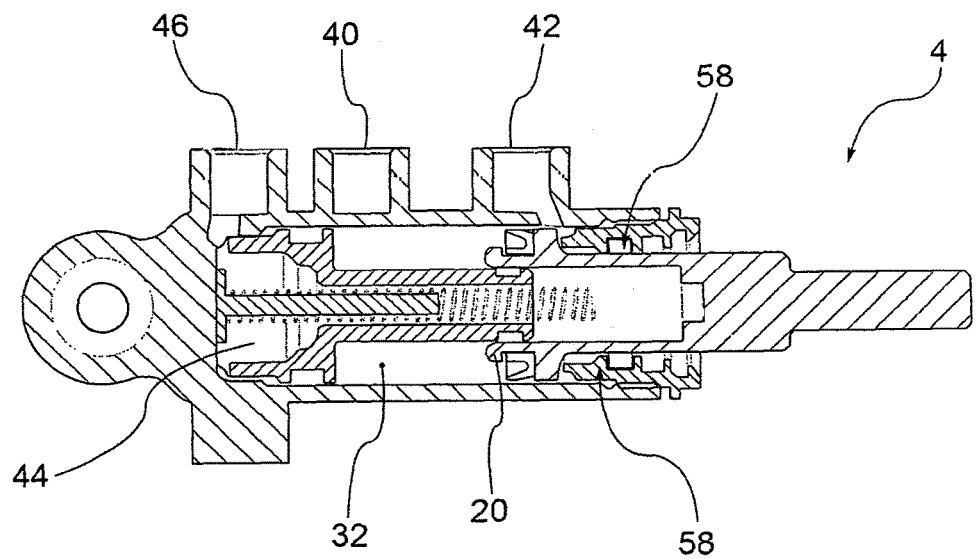

According to a further embodiment (FIGS. 8-9) the body 16 houses coaxial stages. In particular, the body 8 houses the first chamber 32, which defines a delivery stage, and the second chamber 44, which defines a contrast or control stage, wherein said chambers 32, 44 are coaxial and at least partially penetrate each other, despite being fluidically separate from each other.

According to a possible embodiment, the body 16 also delimits a compensation stage defined by a compensation chamber 58 which acts as compensation for variations in the level of liquid of the hydraulic circuit connected to the actuator device for brakes 4. With the compensation stage, in fact, the level or the free surface of the hydraulic fluid in the respective tank remains constant regardless of the position of the piston 20.

According to one embodiment, the automatic actuator 28 comprises motor means 68 and a pump 72, operatively connected to said motor means 68, able to pressurise the fluid to send to the body 16 of the actuator device for brakes 4.

For example, the pressurised fluid may act on the second head 48 of the piston 20 so as to exert on the piston 20 a thrust in a rest direction Y which opposes the thrust in the operating direction X imposed by the lever or operating pedal 12.

Said motor means 68 are mechanically connected to the pump or to a part thereof by means of a kinematism 76.

For example, said at least one kinematism 76 comprises ball bearing screws.

According to one embodiment, the automatic actuator 28 comprises contrast means 80 operatively connected to the lever or pedal 12, so as to be able to exercise a thrust action in accordance or discordance with the operating thrust on the lever or pedal 12.

For example, the contrast means 80 are directly connected to a portion of the operating lever or pedal 12.

According to a possible embodiment, the contrast means 80 are connected to a transmission 84 which operatively connects the operating lever or pedal 12 to the piston 20.

For example, the contrast means 80 are operated by an electric, hydraulic or pneumatic motor.

For example, said electric, hydraulic or pneumatic motor is operatively connected to the contrast means 80 by means of at least one kinematism comprising ball bearing screws.

According to one embodiment, the actuator device for brakes 4 comprises at least one command panel 88 operatively connected to the automatic actuator 28, so as to control the actuation thereof depending on the measurement parameters of the dynamic functioning of the associable vehicle 92.

As may be appreciated from the description, the actuator device for brakes according to the invention makes it possible to overcome the drawbacks of the prior art.

The actuator device for brakes according to the invention allows the user to always have the direct sensation of the manual actuation of the braking device and at the same time to always have the clear and precise sensation of any intervention by the control system of the vehicle to optimise the braking phase and/or to stabilise the vehicle dynamics.

In particular, the user always has the direct control of at least a portion of the hydraulic system connected to the braking devices, and consequently always has the sensation and direct control of said system or of at least a portion thereof, even when the system does not intervene to correct the braking request or dynamically stabilise the vehicle.

The user thus always has the sensation of the effective pressure exerted on at least a part of the braking system given that:

when the control system does not intervene to prevent the blocking of a wheel or to correct the set-up of the vehicle, the system exerts exactly the pressure imposed manually by the user (i.e. the same pressure that the user imposes directly on at least a portion of the system by pressing the lever or pedal), when the control system intervenes to correct braking, for example to avoid an onset of blocking, the control action is immediate and directly opposes the manual action exerted by the user who thus clearly perceives the intervention of the control system systems in which the control is exerted independently on different actuators and/or wheels to the actuators controlled directly by the user, the latter still has an improved feeling of braking. In fact, the direct control even of a single portion (actuator) of the braking system provides the user with an improved feeling of the dynamic behaviour of the vehicle and thus allows him to sense the onset of wheel blocking.

This way, the user always has the feeling complete control of the vehicle.

The actuator device for brakes is also compact, functional and lightweight.

A person skilled in the art may make numerous modifications and variations to the actuator devices described above so as to satisfy contingent and specific requirements while remaining within the sphere of protection of the invention as defined by the following claims.

The invention claimed is:

1. An actuator device for brakes suitable to be operatively connected to at least a first braking device acting on a brake disc or drum, so as to exercise a braking action, the actuator device for brakes being fitted with a lever and/or pedal for its manual operation, and being provided with a body which houses at least one piston which acts on a hydraulic circuit fluidically connected to said at least one first braking device for the hydraulic operation thereof, the lever and/or pedal being operatively connected to said piston so as to command its movement or operating stroke in an operating direction, so as to exert pressure on the fluid of the hydraulic circuit, wherein the actuator device for brakes is fitted with an automatic actuator, operatively connected to the piston and/or to the operating lever and/or pedal, so as to increase, control or reduce the braking action imposed manually by operating the operating lever and/or pedal, controlling the operating stroke of the piston;

wherein the body identifies a first chamber which houses said piston fitted with at least a first head, the first chamber being provided with a delivery opening fluidically connected to the at least one first braking device so as to receive the fluid pressurised by the first head during the stroke of the piston, wherein the body identifies a second chamber which houses a second head of the piston, the second chamber being in connection with the automatic actuator so as to exercise on the piston a thrust action in accordance or discordance with the thrust action exercised by the operating lever and/or pedal;

wherein said first and second chambers are positioned in series with each other and at least partially separated by a separation septum fixed in relation to the body, the piston comprising a stem slidingly ioined in an airtight manner to a hole made on said separation septum, the stem connecting the first and second head of the piston to each other.

2. The actuator device for brakes according to claim 1, wherein the second chamber houses a pusher element connected to the automatic actuator and moved by relative drive means, said pusher element interfacing with the second head of the piston.

3. The actuator device for brakes according to claim 1, wherein the first and the second chamber are fluidically separate from each other.

4. The actuator device for brakes according to claim 1, wherein the second chamber is filled with a liquid pressed by the automatic actuator, so as to be able to exercise a thrust action on the second head following the operation of the automatic actuator.

5. The actuator device for brakes according to claim 1, wherein the second chamber houses elastic return means which exercise a thrust action on the piston pressing it towards a rest condition, in a rest direction, opposite said operating direction.

6. The actuator device for brakes according to claim 1, wherein the body houses a first chamber, which defines a delivery stage, a second chamber, which defines a contrast or control stage, wherein said chambers are coaxial and at least partially penetrate each other, despite being fluidically separate from each other.

7. The actuator device for brakes according to claim 6, wherein the body also delimits a compensation stage defined by a compensation chamber which acts as compensation for variations in the level of liquid of the hydraulic circuit connected to the actuator device for brakes.

8. The actuator device for brakes according to claim 1, wherein the automatic actuator comprises motor means and a pump, operatively connected to said motor means, able to pressurise the fluid to send to the body of the actuator device for brakes.

9. The actuator device for brakes according to claim 8, wherein said motor means are mechanically connected to the pump or to a part thereof by means of a kinematism.

10. The actuator device for brakes according to claim 9, wherein said at least one kinematism comprises ball bearing screws.

11. The actuator device for brakes according to claim 1, wherein the automatic actuator comprises contrast means operatively connected to the lever or pedal, so as to be able to exercise a thrust action in accordance or discordance with the operating thrust on the lever or pedal.

12. The actuator device for brakes according to claim 11, wherein said contrast means are directly connected to a portion of the operating lever or pedal.

13. The actuator device for brakes according to claim 11, wherein said contrast means are connected to a transmission which operatively connects the operating lever or pedal to the piston.

14. The actuator device for brakes according to claim 11, wherein said contrast means are operated by an electric, hydraulic or pneumatic motor.

15. The actuator device for brakes according to claim 14, wherein said electric, hydraulic or pneumatic motor is operatively connected to the contrast means by means of at least one kinematism comprising ball bearing screws.

16. The actuator device for brakes according to claim 1, wherein the automatic actuator is at least partially housed in the body of the actuator device for brakes.

17. The actuator device for brakes according to claim 1, wherein the automatic actuator is mechanically associated to the body of the actuator device for brakes.

18. The actuator device for brakes according to claim 1, comprising at least one control panel operatively connected to the automatic actuator, so as to control the actuation thereof depending on the measurement parameters of the dynamic functioning of the associable vehicle.

* * * * *